United States Patent [19]

Kelley et al.

[11] Patent Number: 5,669,533

[45] Date of Patent: Sep. 23, 1997

[54] RESEALABLE FLUID DISPENSER CAP ASSEMBLY

[75] Inventors: Matthew F. Kelley, Westport, Conn.; Wayne Young, Brewster, N.Y.

[73] Assignee: Creative Products, Inc., Westport, Conn.

[21] Appl. No.: 643,615

[22] Filed: May 6, 1996

[51] Int. Cl.⁶ ............................................ B67D 3/00
[52] U.S. Cl. ............................................ 222/525
[58] Field of Search ............................ 222/523–525, 222/528–530, 538, 537, 559, 453

[56] References Cited

U.S. PATENT DOCUMENTS

| | | | |
|---|---|---|---|
| 2,437,589 | 3/1948 | Bink | 222/525 |
| 3,754,691 | 8/1973 | Filder | 222/525 |
| 4,807,785 | 2/1989 | Pritchett | 222/524 |
| 4,979,653 | 12/1990 | Mon | 222/525 |

Primary Examiner—Philippe Derakshani
Attorney, Agent, or Firm—Melvin I. Stoltz

[57] ABSTRACT

By employing two principal integrated components which incorporate a reusable sealing member, a resealable product dispensing trigger assembly is achieved. By mounting these two components to a container within which the desired product is retained, a complete fluid product holding and dispensing system is realized. In the present invention, the fluid product holding and dispensing system is alternately repeatedly movable between two separate and distinct locked positions which assures that the system is retained in either locked position, until change is desired by the user. In one position, the container is sealed, while in the second position, the container is open and the fluid is accessible. By employing the present invention, users are assured that the product retained in the container remains sealed until use is desired and accidental opening of the container is completely eliminated. Furthermore, the product can be partially used and resealed by returning the dispensing system to its first position.

10 Claims, 4 Drawing Sheets

FIG. 8

RESEALABLE FLUID DISPENSER CAP ASSEMBLY

RELATED APPLICATIONS.

This application is related to U.S. Provisional application Ser. No. 60/001,747, filed Aug. 1, 1995 for a Resealable Fluid Dispenser invented by Matthew F. Kelley and Wayne Young.

TECHNICAL FIELD

This invention relates to product holding and dispensing containers, and more particularly, to sealed product containers accessible only for use.

BACKGROUND ART

With the ever-increasing addition of new products in the marketplace, substantial attention has been paid to improving product containers, in general, and fluid product holding and dispensing containers; in particular. In this regard, numerous products being sold in a wide variety of channels require the storage of fluid products in a suitable container, with the product being completely sealed within the container prior to use, while also being quickly and easily accessed by the user whenever the products needs to be dispensed.

Due to the wide variety of fluid products sold in the marketplace, numerous fluid product holding and dispensing systems have been created in an attempt to satisfy the variety of applications and needs existing in the marketplace. However, these prior art systems have been incapable of fully and completely meeting all of the requirements imposed upon a fluid product holding and dispensing container.

In particular, the industry has sought a fluid product holding and dispensing container which enables the fluid product to be completely sealed after filling of the container with the sealed container remaining intact until use of the product is desired. Furthermore, when the product is to be used, rapid access to the product is sought without requiring the user to physically rupture the seal in order to attain access to the product. In addition, it is often desired for the container to be capable of being automatically sealed and unsealed as part of the dispensing system.

Although numerous prior art systems have been developed in an attempt to meet the demands of the industry, these prior art systems have been incapable of satisfying the industry demands. In general, these prior art attempt have been incapable of providing completely dependable product holding and dispensing systems which are consistent and repeatable in their performance. Furthermore, these prior art systems generally comprise complex constructions which require numerous components or subassemblies, necessitating costly manufacturing expenses and assembly efforts. In addition, prior art systems have been unable to achieve a low-cost, easily assembled system which is automatically sealable and capable of being used for dispensing all types of fluid products, including products requiring sterilization, while also be resealable, if repeated use is desired.

Furthermore, the dispensing of sterilized fluid products represents a major portion of the industry in which holding and dispensing containers are required. However, prior art product holding and dispensing systems have been incapable of satisfying all of the requirements imposed upon systems for holding and dispensing sterilized fluid products.

Therefore, it is a principal object of the present invention to provide a fluid product holding and dispensing system which is capable of being manufactured and shipped with the product completely sealed in a container with that seal quickly and easily ruptured or opened by the user when desired.

Another object of the present invention is to provide a fluid product holding and dispensing system having the characteristic features described above which assures the product remains sealed during shipping and storage, until use is desired.

Another object of the present invention is to provide a fluid product holding and dispensing system having the characteristic features described above which enables the user to quickly and easily activate the system by automatically rupturing or opening the seal to allow the product to be dispensed therethrough.

Another object of the present invention is to provide a fluid product holding and dispensing system having the characteristic features described above which allows all components and products to be fully and completely sterilized prior to distribution.

Another object of the present invention is to provide a fluid product holding and dispensing system having the characteristic features described above which employs a minimum number of components which are easily manufactured and assembled.

Another object of the present invention is to provide a fluid product holding and dispensing system having the characteristic features described above which is usable with virtually any desired product holding container regardless of the size or shape.

Other and more specific objects will in part be obvious and will in part appear hereinafter.

SUMMARY OF THE INVENTION

By employing the present invention, all of the difficulties and drawbacks of the prior art constructions are eliminated and an efficient, easily manufactured, dependable, fluid product holding and dispensing system is attained. By employing the present invention, any desired fluid product is packaged and is completely sealed until use of the product is desired. Once use is desired, the system is activated, causing the seal to be broken or opened, enabling the fluid product to be dispensed.

In the present invention, the fluid product holding and dispensing system is alternately movable between two separate and distinct locked positions which assures that the system is retained in either locked position, until change is desired by the user. As a result, accidental or unwanted activation of the system is completely eliminated. In addition, in one position, the container is sealed, while in the second position, the container is open and the fluid is accessible. Consequently, users are assured that the product retained in the container will remain sealed until use is desired and accidental opening of the container is completely eliminated. Furthermore, if desired, the product can be partially used and resealed by returning the dispensing system to its first position.

In order to eliminate the prior art problems which have remained unresolved until the present invention, the present invention employs two principal integrated components which cooperate to achieve a product dispensing, resealable trigger assembly. By mounting these two components to a container within which the desired product is retained, the complete fluid product holding and dispensing system is realized.

By achieving a two-component fluid, resealable product holding and dispensing trigger assembly, an easily manufactured, reasonably priced system is attained which is capable of providing all of the desired results. Furthermore, the present invention provides a construction which is easily manufactured, is cost effective, and is reliable. As a result, the present invention satisfies all of the needs which prior art constructions have been incapable of attaining.

In the preferred construction of the present invention, any desired fluid product is placed in a generally conventional bottle using generally conventional filling techniques. Although any desired bottle construction and bottle material can be employed for retaining the desired product, viscous products are preferably contained in flexible plastic bottles in order to allow the material to be easily dispensed by squeezing of the flexible bottle member.

In order to enable the fluid containing bottle to be sealed when not in use and easily accessed, whenever use is desired, the product dispensing trigger assembly of the present invention is mounted to the bottle. In the preferred embodiment, the product dispensing trigger assembly of the present invention comprises two components consisting of a cap and guide member and a head or cover member. In the preferred construction, the cap/guide member comprises a threaded portion which is threadedly engaged with the threaded collar of the bottle. This threaded collar defines the portal zone for the bottle, with the cap/guide member comprising an elongated hollow cylindrically shaped flow channel for delivering the fluid. In addition, the cylindrical portion of the cap/guide member comprises a resealable portal constructed for controlling the flow of the fluid product.

The second principal component of the product dispensing trigger assembly of the present invention comprises a head or cover portion which is constructed for telescopic, overlying, axially movable interengagement with the cap/guide member. In addition, the head or cover member incorporates lock engaging means formed therewith, positioned for cooperating locking interengagement with the cap/guide member. In this way, when the cap/guide member is telescopically interengaged with the head member, two alternate locked positions are attainable by moving the head or cover member relative to the cap member.

In addition to incorporating cooperating lock engaging means, the head member also incorporates a movable plug member integrally formed therewith. In the preferred construction, the plug member is positioned for cooperating relationship with the resealable portal of the cap/guide member. When the head or cover member is telescopically engaged with the cap/guide member in its first locked and sealed position, the plug member of the head or cover member is securely mounted in the portal of the cap/guide member, completely sealing the fluid product in the bottle and preventing the product from being dispensed. Whenever the user desires to move the head or cover member relative to the cap/guide member from its first locked and sealed position into its second locked and open position, an actuation force is applied to the cover or head member. This force causes the cover or head member to move relative to the cap/guide member, simultaneously causing the plug member of the cover or head member to move therewith, disengaging itself from the portal of the cap/guide member. As a result, the bottle is opened and the fluid product contained therein is accessible.

In addition to providing rapid, controlled opening of the sealed fluid containing bottle, the product dispensing cover assembly of the present invention is constructed to assure that the two alternate locked positions are maintained, once either position is engaged. Only by positive action of the user is movement between the first locked position and the second locked position attainable.

In the present invention, the prior art difficulties and drawbacks are overcome and an easily assembled, dependable, low-cost, resealable fluid product holding and dispensing system is achieved which is maintained in a fully sealed configuration in a first position, assuring both sterility and product securement in the associated container. In addition, the fluid product holding and dispensing system of this invention is also quickly and easily moved from its sealed position to its fully open position, enabling use of the product when desired. Furthermore, the fluid product holding and dispensing system of the present invention is preferably constructed to allow easy return movement from the open position to the sealed position, thereby enabling the product to be tightly and securely resealed, for storage and subsequent use.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DESCRIPTION

In FIGS. 1–8, the preferred embodiment of the fluid product holding and dispensing system of the present invention is fully depicted. This embodiment is presented as a representation of one construction that can be employed for attaining the benefits of the present invention. However, the present invention is not limited to this embodiment and variations thereof can be made without departing from the scope of this invention. Consequently, this preferred embodiment is provided as an example of the present invention and not as a limitation thereof.

In FIGS. 1–5, fluid product holding and dispensing system 20 is depicted comprising fluid holding bottle 22, and product dispensing trigger assembly 24. In this embodiment, product dispensing trigger assembly 24 comprises cap and guide member 25 and head or cover member 26.

As depicted, bottle 22 comprises a generally conventional, cylindrical construction incorporating an internal retaining zone 30 within which the desired fluid product is placed. Bottle 22 comprises a collar 31 which incorporates entry portal 33 for enabling the desired fluid to be inserted into retaining zone 30 as well as removed therefrom. Preferably, upstanding collar 31 also incorporates thread means 32, formed on the outer surface thereof for enabling closure and sealing means to be secured thereto.

As discussed above, bottle 22 may comprise any desired size and shape and may be formed from any desired material. For use in the present invention, bottle 22 must only be able to store the desired fluid product in zone 30 and be able to securely receive and retain cap/guide member 25 therewith.

As clearly shown in FIGS. 1–5 and 7, cap and guide member 25 comprises collar engaging portion 34 and cylindrically shaped tube portion 35. In the preferred construction, collar engaging portion 34 of cap/guide member 25 is constructed for peripherally surrounding and being securely affixed to collar 31 of bottle 22.

Typically, collar engaging portion 34 is dimensioned to correspond with the dimensions of collar 31. As depicted, collar engaging portion 34 incorporates a cylindrical shape with thread means 40 formed on the inside surface thereof, with the inside diameter of collar engaging portion 34 constructed for cooperative, overlying interengagement with collar 31 of bottle 22. In this way, cap/guide member 25 is quickly and easily securely affixed to bottle 22 by threadedly engaging thread means 40 of collar engaging portion 34 with thread means 32 of collar 31 of bottle 22. Once in this position, cap/guide member 25 is mounted to bottle 22 in overlying relationship with portal 33.

In its preferred construction, hollow cylindrical tube portion 35 of cap/guide member 25 is integrally formed with collar engaging portion 34, with the central axis of cylindrical tube portion 35 co-axially aligned with the central axis of cylindrically shaped collar engaging portion 34. In this way, cap/guide member 25 essentially defines and comprises an elongated, centrally located, open, hollow channel 41 integrally formed therein.

In the preferred embodiment, a radial flange 36 is formed at the terminating end of tube portion 35 and constructed to extend inwardly from hollow channel 41. If desired, a single, substantially continuous flange 36 may be employed or, alternatively, a plurality of flange segments may be used. As detailed below, flange 36 cooperates with head or cover member 26 to provide one of the two alternate locked positions.

The construction of cap/guide member 25 of the present invention is completed by forming a portal zone 42 at the juncture between channel 41 and the inside surface of collar engaging portion 34. In the preferred embodiment, portal 42 is formed by a substantially continuous, tapered or sloping wall member 43 which cooperates with a radially extending ledge 44 formed at the juncture of portal 42 with channel 41. The interengagement of ledge 44 with sloping wall 43 forms junction point 45.

By referring to FIGS. 1–6, the construction and cooperative operational interengagement of head or cover member 26 with cap/guide member 25 can best be understood. In the preferred construction, head/cover member 26 comprises an outer surface defining shell or housing preferably formed as a first, elongated, substantially cylindrically shaped central portion 50, a second lower, substantially cylindrically shaped, co-axially aligned portion 51 comprising a diameter greater than first cylindrical portion 50, and an intermediate, interconnecting ramp portion 52 extending from first cylindrical portion 50 and second cylindrical portion 51. In the preferred embodiment, intermediate, ramped portion 52 is constructed for interconnecting and smoothly blending the surface of first portion 50 with the surface of second portion 51.

Finally, the outer surface construction of cover or head member 26 is completed by forming an applicator mounting surface 53 to the terminating end of first cylindrical portion 50. Although the incorporation of applicator mounting surface 53 is preferred, for providing a readily usable surface to which a desired applicator can be mounted to assist in the dispensing of the fluid product contained in bottle 22, the actual construction and formation of applicator mounting surface 53 will vary depending upon the contents of bottle 22 and the manner in which the contents thereof is employed. Consequently, the overall construction depicted in FIGS. 1–6, in showing a particular applicator mounting surface 53, is merely exemplary of one particular structure, and any desired applicator surface, or dispensing element, can be formed on head or cover member 26, without departing from the scope of this invention.

Similarly, the outer surface of head or cover member 26 can be varied in construction, size, shape, or visual appearance, depending upon a particular application being employed or the particular bottle 22 with which head or cover member 26 is affixed. Although the incorporation of cylindrical portions 50 and 51 with intermediate portions 52 is preferred, for providing a highly visible surface which is easily accessed by the user for cooperatively moving head or cover member 26 relative to cap/guide member 25 as detailed below, alternate constructions can be employed for head or cover member 26 without departing from the scope of this invention.

As shown in FIGS. 1–6, first cylindrical portion 50 of head or cover member 26 defines the generally cylindrically shaped outer surface. In addition, first cylindrical portion 50 also incorporates a cylindrically shaped inside wall 55, which is formed with a diameter slightly greater than the diameter of cylindrical tube portion 35. In the preferred construction, inside wall 55 defines and establishes a central elongated channel or cavity 54 which extends through first cylindrical portion 50, as well as the interior zone of cylindrical portion 51 and intermediate portion 52. In this way, central, elongated cavity 54 is formed extending completely through head or cover member 26.

In the preferred construction, head or cover member 26 also incorporates a support plate 56 formed in channel 54 diametrically extending from inside wall 55. In the preferred construction, support plate 56 incorporates a plurality of holes or passageways 48 formed in plate 56 in order to enable the fluid product to flow completely through channel 54 whenever desired. Alternatively, plate 56 may be formed as a narrow bridge having a length substantially equivalent to the diameter of inside wall 55 so as to be affixed at its opposed ends to a portion of inside wall 55, and comprising a width which is not greater than the diameter of inside wall 55, in order to assure that elongated channel or cavity 54 extends continuously through head or cover member 26.

In addition, in the preferred construction, support plate 56 incorporates a central aperture 57 formed therein substantially at the midpoint of plate 56, with aperture 57 being defined by sloping wall member 58. Furthermore, locking clip means 59 is mounted to support plate 56, peripherally surrounding aperture 57, extending therefrom towards intermediate portion 52. In the preferred construction, locking clip means 59 incorporates a radially extending flange 49 which is formed extending towards inside wall 55. As detailed below, this construction cooperates with flange 36 of tube portion 35 to provide the desired locked engagement thereof.

Figure 1:
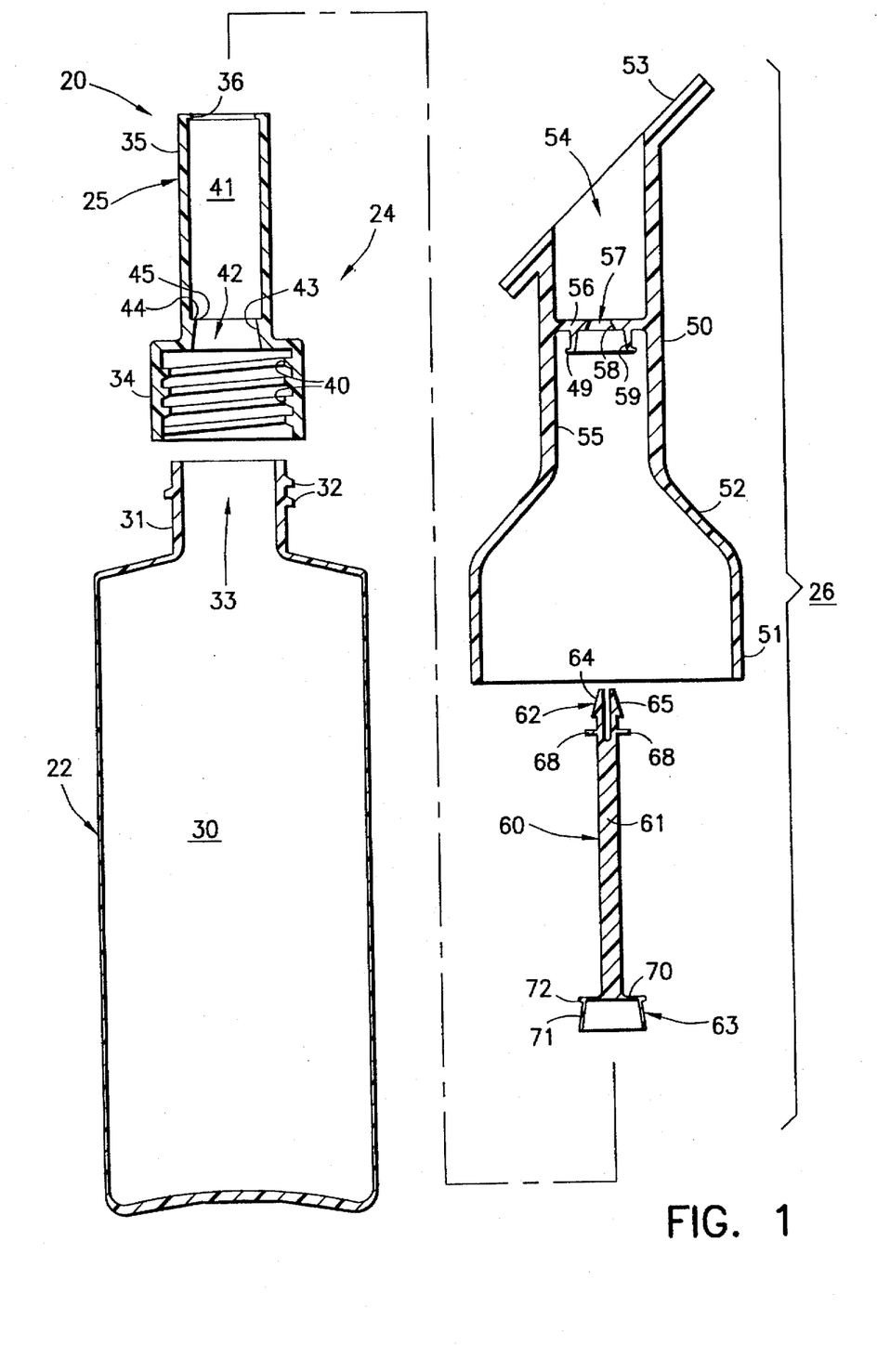
FIG. 1 is an exploded, cross-sectional, side elevation view, depicting each of the components forming the fluid product holding and dispensing system of the present invention.
Figure 8:
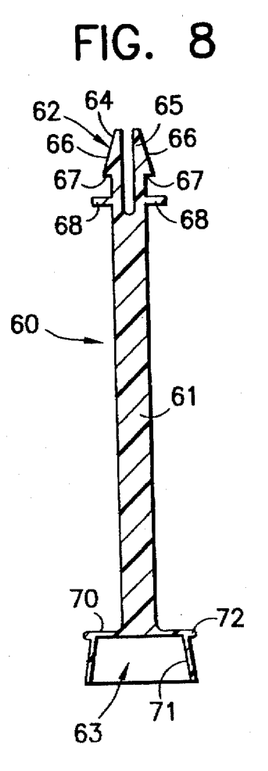
FIG. 8 is an enlarged cross-sectional side elevation view of the sealing rod of the head or cover member.

The construction of head or cover member 26 is completed by forming and mounting elongated sealing rod 60 to support plate 56, enabling sealing rod 60 to extend from plate 56 a substantial length of head or cover member 26, coaxially aligned with channel 54. As best seen in FIGS. 1 and 8, in its preferred construction, sealing rod 60 comprises an elongated shaft 61, with plate engaging and locking member 62 mounted at one end of shaft 61, and a tapered plug member 63 mounted at the opposed end of shaft 61.

In the preferred construction, plate engaging and locking member 62 comprises two juxtaposed, spaced, flexible fingers 64 and 65, each of which comprise a ramped or sloping surface 66 which terminates with flat surface 67 extending substantially perpendicularly from shaft 61. In addition, two radially extending flange plates 68,68 are mounted to shaft 61, positioned in juxtaposed, spaced, facing relationship to flat surfaces 67,67.

Preferably, the distance between radially extending flange plates 68,68 and flat surfaces 67,67 is substantially equivalent to the thickness of support plate 56 of head or cover member 26. In this way, as detailed below, sealing rod 60 is quickly and easily mounted and securely retained by support plate 56.

In completing the preferred construction of sealing rod 60, tapered plug member 63 is constructed by forming an enlarged, substantially circular shaped plate 70 at the terminating end of shaft 61, with plate 70 extending substantially perpendicularly to the central axis of shaft 61. In addition, a substantially circular shaped, sloping wall 71 is formed with one end thereof affixed to plate 70 and extending outwardly therefrom. In the preferred construction, the end of wall 71 affixed to plate 70 is inwardly spaced from the terminating edge of plate 70, defining therewith a radially extending lip 72 peripherally surrounding the juncture between wall 71 and plate 70.

By employing this construction for sealing rod 60, the desired, integral, repeatedly activated, reusable sealing capabilities of head or cover member 26 with cap/guide member 25 is attained. By referring to FIGS. 2–5, and the following detailed disclosure, the cooperating interengagement and secure repeatable locking construction attained by the present invention is fully understood.

In the preferred construction of head or cover member 26, the diameter of inside wall 55 of first cylindrical portion 50 is slightly greater than the outer diameter of cylindrical tube portion 35 of cap/guide member 25. In this way, first cylindrical portion 50 of head or cover member 26 peripherally surrounds tube portion 35 and is telescopically axially movable relative thereto. By employing this construction, head or cover member 26 is easily mounted to cylindrical tube portion 35 of cap/guide member 25 in order to enable head or cover member 26 to be telescopically movable relative to cylindrically shaped tube portion 35.

In the present invention, product dispensing trigger assembly 24 is quickly and easily assembled by telescopically engaging head or cover member 26 with cap/guide member 25. Then, sealing rod 60 is securely mounted to head or cover member 26 by axially advancing plate engaging and lock member 62 through portal 42 and central channel 41 of cap/guide member 25, until plate engaging and lock member 62 is securely mounted to support plate 56 of head or cover member 26. Once sealing rod 60 is affixed to support plate 56, the construction of trigger assembly 24 is complete.

The secure affixation of sealing rod 60 to support plate 56 is quickly and easily attained due to the cooperating construction of sealing rod 60 and head or cover member 26. In order to attain this secure interengagement, plate engaging and lock member 62 of sealing rod 60 is aligned with sloping wall 58 of aperture 57 of support plate 56. Due to the cooperating construction of sloping surface 66 of flexible fingers 64 and 65 with tapered wall 58 of aperture 57, sealing rod 60 need only be axially advanced into ever increasing interengagement with support plate 56 once initially aligned with aperture 57. By continuously axially advancing sealing rod 60 through aperture 57, flexible fingers 64 and 65 are forced towards each other, by the camming action of sloping surface 66, until flat surface 67 has passed through aperture 57. Once this position has been reached, flexible fingers 64 and 65 return to their original positions, with flat surface 67 effectively locking shaft 61 of sealing rod 60 in position with support plate 56.

Furthermore, flange plates 68,68, which radially extend from shaft 61 and are spaced away from surfaces 67,67 by a distance substantially equal to the thickness of plate 56, are simultaneously brought into contact with the lower surface of support plate 56 and provide further secure, locked, affixed attachment of sealing rod 60 to support plate 56. In addition, the length of shaft 61 of sealing rod is constructed for enabling sealing rod 60 to be movable between a first position wherein tapered plug member 63 is mounted in secure sealingly closed engagement with portal 42 of cap/guide member 25, and a second position wherein tapered plug member 63 is disengaged from portal 42, enabling the fluid product to flow therethrough.

The telescopic movability and axial interengagement of head or cover member 26 with cap/guide member 25 between its two alternate positions is clearly depicted in FIGS. 2–5. Furthermore, as detailed below, head or cover member 26 is repeatably movable from its sealed position to its unsealed position, as well as lockingly interengageable with cap/guide member 25 in its two alternate positions. This operational construction is also shown in FIGS. 2–5 and fully detailed below.

Figure 2:
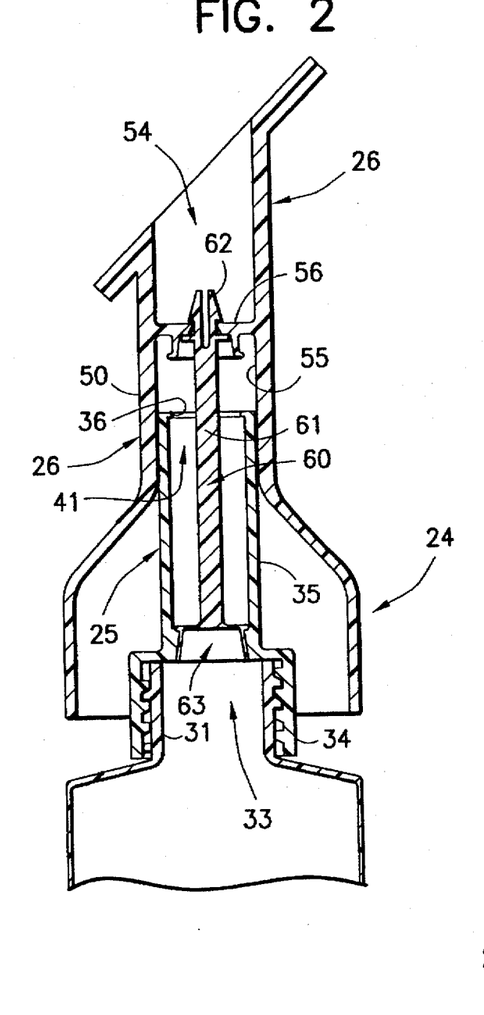
FIGS. 2 and 3 are cross-sectional side elevation views of the fully assembled fluid product holding and dispensing system of the present invention shown in its first locked and sealed position.
Figure 3:
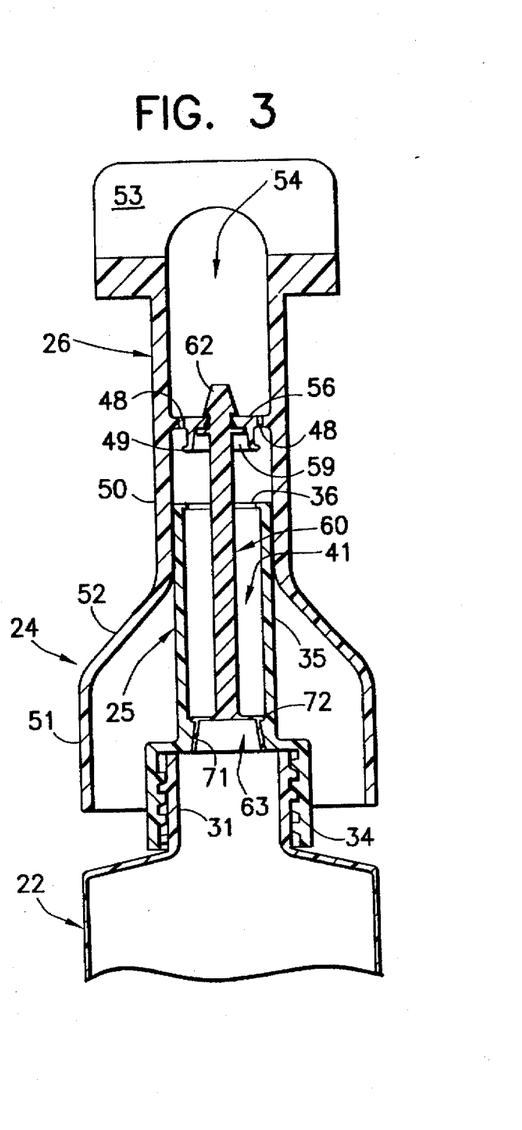

By referring to FIGS. 2 and 3, the first locked position of trigger assembly 24 of the present invention is fully depicted. As evident from FIGS. 2 and 3, when product dispensing trigger assembly 24 is in its first locked position, tapered plug member 63 is sealingly mounted in portal 42 of cap/guide member 25, providing secure, sealed closure of bottle 22. As a result, without requiring specific seal means mounted to portal 33 of bottle 22, product dispensing trigger assembly 24 provides, in its inherent structure, the desired secure sealing of bottle 22 in a manner which assures that the product contained therein is incapable of being dispensed until desired.

In order to assure product dispensing trigger assembly 24 is maintained in this first, sealed and locked position, tapered plug member 63 is constructed for cooperating, locking interengagement with portal 42 of cap/guide member 25. As detailed above, tapered plug member 63 is constructed with a flat plate 70 extending substantially perpendicularly from the axis of shaft 61, with sloping wall member 63 extending from the lower surface of plate 70. In addition, the edge of wall 71 extending from plate 70 is spaced inwardly of the outside diameter of plate 70 in order to form peripherally surrounding radial lip 72.

In order to provide the desired, secure, sealed and locked interengagement of tapered plug member 63 with portal 42, the diameter of plate 70 is constructed to be substantially equivalent to the diameter of channel 41 of cylindrical tube portion 35. In addition, the diameter and slope of wall 71 is constructed for being substantially equivalent to the diameter and slope of wall 43 forming portal 42.

By employing this construction, head or cover member 26 is quickly and easily moved into secure, locked and sealed interengagement with cap/guide member 25 by telescopically raising head or cover member 26 relative to cap/guide member 25 until plate 70 and radial lip 72 of plug member 63 is moved upwardly through portal 42. As the telescopic movement of head or cover member 26 relative to cap/guide member 25 continues, plug member 63 continues to move through portal 42 until radially extending lip 72 is forced passed tapered wall 43 of portal 42 and reaches juncture point 45 and ledge 44 of portal 42.

Once in this position, further upward movement of plug member 63 relative to portal 42 is prevented due to the secure, sealed contacting interengagement of tapered wall 71 of plug member 63 with tapered wall 43 of portal 42. With further upward movement of head or cover member 26 being prevented, the contents of bottle 22 are sealed and completely prevented from being dispensed until desired.

Furthermore, once head or cover member 26 is in this first sealed position, head or cover member 26 is also lockingly engaged with cap/guide member 25 in a manner which prevents unwanted opening of product dispensing trigger assembly 24. This secure, locked interengagement is achieved by the cooperating engagement of radially extending lip 72 of plug member 63 with ledge 44 and juncture point 45.

Since all of these components are constructed for dimensional cooperative interengagement, radially extending lip 72 is in direct contact with ledge 44, thereby resisting vertical movement of plug member 63 relative to cap/guide member 25 until an actuation force is imposed upon head or cover member 26 which is sufficient to overcome the secure, locked, frictional interengagement between plug member 63 and ledge 44. As a result of this construction, product dispensing trigger assembly 24 is maintained in a secure, locked, sealed configuration until the user desires to gain access to the product contained in bottle 22 by imparting an actuation or opening force to head or cover member 26 which is sufficient to disengage plug member 63 from locked engagement with ledge 44 and portal 42.

Whenever the user desires to employ the product contained in bottle 22, the user imparts an actuation force to head or cover member 26 of product dispensing trigger assembly 24 which is sufficient to cause head or cover member 26 to telescopically move relative to cap/guide member 25 in a manner which disengages tapered plug member 63 from portal 42.

Figure 4:
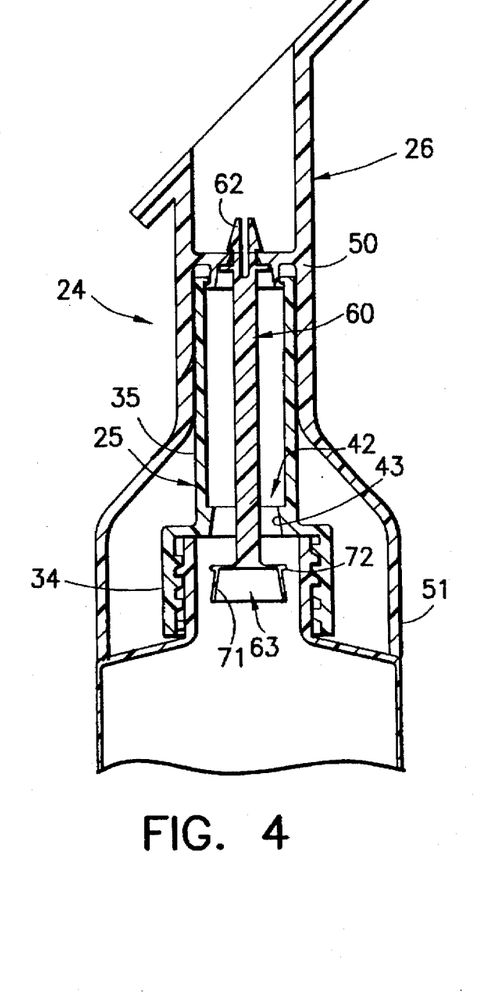
FIGS. 4 and 5 are cross sectional side elevation views of the fluid product holding and dispensing system of the present invention depicted in its second open and locked position.
Figure 5:
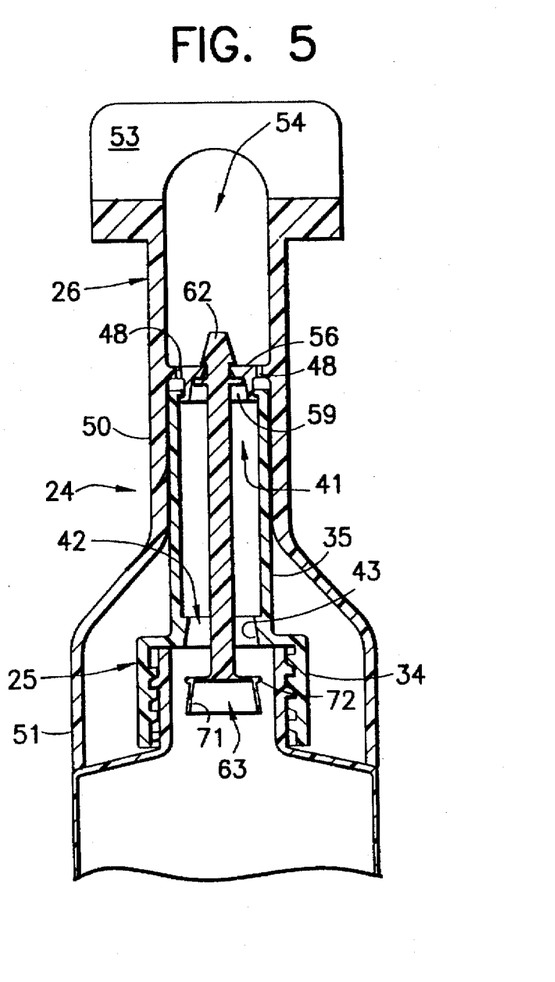
Figure 6:
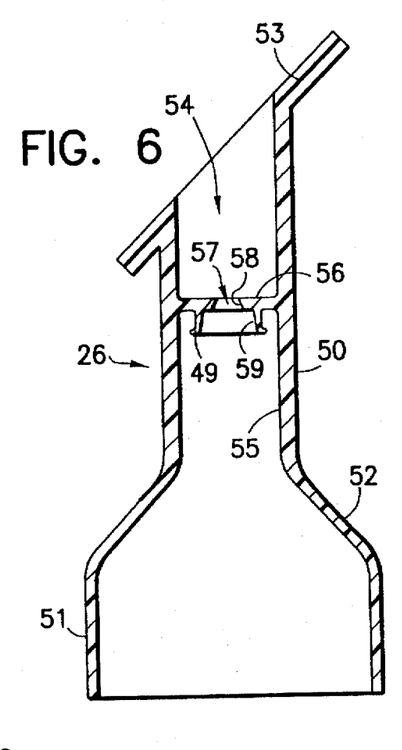
FIG. 6, is a cross-sectional side elevation view of the head or cover member of the fluid product holding and dispensing system of the present invention.
Figure 7:
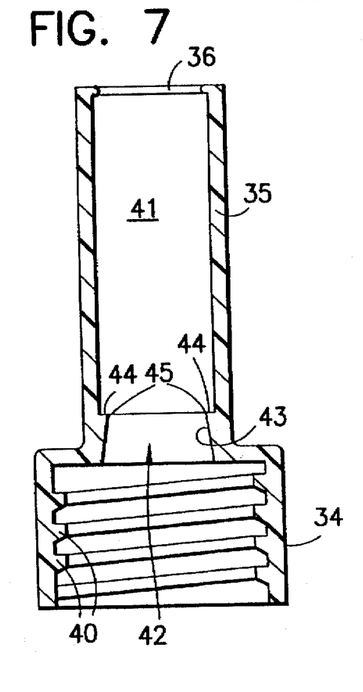
FIG. 7 is a cross-sectional side elevation view of the cap/guide member of the fluid product holding and dispensing system of the present invention.

Once this actuation force has been imparted to head or cover member 26, head or cover member 26 is moved from its first locked and sealed position, as depicted in FIGS. 2 and 3, to its opened, product dispensing position, as depicted in FIGS. 4 and 5. As shown in FIGS. 4 and 5, when product dispensing trigger assembly 24 has been moved into this second position, portal 42 of cap/guide member 25 is completely opened, enabling the product contained within bottle 22 to be freely dispensed through portal 42 and cooperating flow channel 41 of cap/guide member 25, as well as channel 54 of head or cover member 26.

As detailed above, support plate 56 is constructed with either a plurality of holes formed therein or with a dimension which allows the product contained within bottle 22 to freely flow through or about plate 56. As a result, when portal 42 is opened, by the removal of plug member 63 therefrom, the fluid product in bottle 22 is capable of flowing completely through the interior of trigger assembly 24, for being dispensed in the desired manner.

In order to provide trigger assembly 24 with a locked configuration when in its second, portal open position, the telescopic, axial movement of head or cover member 26 relative to cap/guide member 25, which dislodges plug member 63 from portal 42, also simultaneously advances radially extending flange 36 of tube portion 35 towards support plate 56. As the terminating edge of tube portion 35 advances toward plate 56, radial flange 36 is brought into contact with depending clip means 59 which extends from support plate 56.

In the preferred construction, as radially extending flange 36 of cylindrical tube portion 35 advances into contact with clip means 59 and flange 49 thereof, clip means 59 and flange 49 are deflected as flange 36 advances passed flange 49. Once the terminating edge of cylindrical tube portion 35 is brought into contact with support plate 56, plug member 63 is fully dislodged from engagement with portal 42 and trigger assembly 24 is maintained in its second position in a securely locked mode.

In the preferred embodiment, this locked configuration is attained by the contact between cooperating radial flange 36 of tube portion 35 and radial flange 49 of clip means 58. Since these flanges are constructed to be maintained in locked interengagement, the second position is maintained with portal 42 remaining open until forces are applied to head or cover member 26 sufficient to disengage flange 49 from flange 36 and return trigger assembly 24 to its first sealed and locked position.

As is evident from the foregoing disclosure, the fluid product holding and dispensing system of the present invention achieves a unique construction providing an inexpensive, easily manufactured system which establishes an internally sealed construction capable of being quickly and easily employed. By employing the present invention, any bottle, when filled with the desired product, merely requires the secure attachment of product dispensing trigger assembly 24 thereto, thereby establishing a fully sealed product which can be sterilized, when desired, after any other requisite product preparation procedures are completed. Using the present invention, assurance is provided that the product contained in the bottle is completely sealed, free from adverse and unwanted exposure to ambient surroundings.

In addition, the fluid product holding and dispensing system 20 of the present invention provides a reliable, easily employed, repeatedly usable construction which enables any desired fluid product contained in bottle 22 to be dispensed therefrom whenever desired by the user, while assuring that the product is only dispensed when desired. As detailed above, all of the drawbacks found in prior art constructions have been overcome by this embodiment of the present invention and a unique, easily employed, dependable, resealable, fluid product holding and dispensing system is attained. It will thus be seen that the objects set forth above, among those made apparent from the preceding description, are efficiently attained and, since certain changes may be made in the above article without departing from the scope of the invention, it is intended that all matter contained in the above description, or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim is new and desire to secure by Letters Patent is:

1. A fluid product holding and dispensing system constructed for enabling the product to be repeatedly sealed when not in use, and easily accessed whenever use is desired, comprising a fluid product retaining bottle incorporating a dispensing portal and a product dispensing trigger assembly, said trigger assembly comprising:

A. a first member comprising
      a. a bottle engaging portion mountable to the bottle in cooperating relationship with the dispensing portal and defining an internal cavity,
      b. an elongated, guide portion mounted to the bottle engaging portion in cooperating association with the internal cavity thereof, and defining an internal fluid delivery channel, and
      c. a portal zone formed at the juncture of the fluid delivery channel of the guide portion with the cavity of the bottle engaging portion; and
   B. a second member cooperatively associated with the first member and comprising
      a. a body constructed for cooperative association with the guide portion of the first member for movement relative thereto between at least two alternate positions,
      b. a central passageway extending substantially the entire length of the body and constructed for co-axial alignment with the fluid delivery channel of the guide portion, and
      c. portal zone closure means mounted to the body for movement therewith and movable between a first portal zone sealing position and a second portal zone open position;

whereby a fluid product holding and dispensing system is attained which is capable of being repeatedly moved between a product sealed position and a product dispensing position.

2. The fluid product holding and dispensing system defined in claim 1, wherein said elongated guide portion is further defined as comprising a generally hollow cylindrical shape and the body of the second member is further defined as being shaped for peripheral, surrounding, cooperating, telescopic engagement with said cylindrically shaped guide portion.

3. The fluid product holding and dispensing system defined in claim 2, wherein said second member is further defined as comprising an elongated support rod mounted to the body in coaxial alignment with said central passageway and comprising said portal zone closure means securely mounted to a second end thereof.

4. The fluid product holding and dispensing system defined in claim 3, wherein said body of said second member is further defined as comprising a rod support member mounted to the body in juxtaposed, cooperating relationship with the central passageway thereof and constructed for securely retaining the first end of said elongated rod.

5. The fluid product holding and dispensing system defined in claim 4, wherein said support plate is further defined as comprising an aperture formed therein and said rod is further defined as comprising a pair of flexible locking fingers formed at the first end thereof constructed for mating, secure, locking interengagement with the aperture of said plate.

6. The fluid product holding and dispensing system defined in claim 1, wherein the portal zone of the first member is further defined as comprising a substantially continuous sloping wall forming the portal zone and the portal zone closure means mounted to the body of the second member is further defined as comprising an outer surface constructed for mating, contacting, abutting interengagement with the sloping wall of the portal zone.

7. The fluid product holding and dispensing system defined in claim 6, wherein said portal zone of the first member is further defined as comprising a radially extending ledge formed at the juncture between the sloped wall portion and the internal cavity of the guide portion, and the portal zone closure means of the second member is further defined as comprising a radially extending lip portion formed about the cooperating wall portion for lockingly engaging with the ledge to maintain the closure means in secure interengagement with the portal zone of the first member, whereby said cooperating interengagement of said components achieves both sealing and locking interengagement therebetween.

8. The fluid product holding and dispensing system defined in claim 1, wherein said guide portion is further defined as comprising an inwardly extending radial flange formed at the terminating end thereof and said body of the second member is further defined as comprising clip means formed on the inside walls thereof for cooperating, locking interengagement with the radial flange of the guide portion for securely locking and maintaining the second member in engagement with the first member wherein said components are moved into their second position.

9. The fluid product holding and dispensing system defined in claim 1, wherein said fluid product retaining bottle is further defined as comprising a thread bearing collar peripherally surrounding and forming the dispensing portal thereof and said bottle engaging portion of the first member is further defined as comprising thread means constructed for cooperating, secure, threaded interengagement with the thread means of the bottle, thereby providing a construction wherein said components can be quickly and easily mounted in interengagement.

10. The fluid product holding and dispensing system defined in claim 1, wherein said second member is further defined as comprising a dispensing surface formed thereon constructed for receiving any desired dispensing member for assisting in the transferral of the fluid product from the central passageway to the application site desired by the user.

* * * * *